(12) United States Patent
Kogan et al.

(10) Patent No.: US 7,480,138 B2
(45) Date of Patent: Jan. 20, 2009

(54) RECONFIGURABLE MOBILE DEVICE DOCKING CRADLE

(75) Inventors: Eduard M. Kogan, Howard Beach, NY (US); Ian Jenkins, Stony Brook, NY (US); Kenneth J. Rivalsi, Lake Grove, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 457 days.

(21) Appl. No.: 11/172,510

(22) Filed: Jun. 30, 2005

(65) Prior Publication Data

US 2007/0002533 A1    Jan. 4, 2007

(51) Int. Cl.
*G06F 1/16* (2006.01)
(52) U.S. Cl. .................. 361/686; 710/303; 710/304
(58) Field of Classification Search ......... 361/679–683, 361/686, 724–727; 710/303, 304; 312/223.1, 312/223.2, 333; 439/86, 271, 775; 235/375, 235/472.01
See application file for complete search history.

(56) References Cited

U.S. PATENT DOCUMENTS

| 4,527,285 | A | * | 7/1985 | Kekas et al. ............... 398/164 |
| 5,052,943 | A | * | 10/1991 | Davis ......................... 439/357 |
| 5,186,635 | A | * | 2/1993 | Pechulis et al. .............. 439/89 |
| 5,249,103 | A | * | 9/1993 | Forsythe ..................... 361/730 |
| 5,280,229 | A | | 1/1994 | Faude et al. |
| 5,627,727 | A | * | 5/1997 | Aguilera et al. ............. 361/686 |
| 5,708,707 | A | * | 1/1998 | Halttunen et al. ........... 379/446 |
| 5,841,424 | A | * | 11/1998 | Kikinis ....................... 345/168 |
| 5,978,569 | A | | 11/1999 | Traeger et al. |
| 6,341,218 | B1 | | 1/2002 | Poplawsky et al. |
| 6,823,415 | B1 | * | 11/2004 | Asaad et al. ................ 710/303 |
| 7,117,311 | B1 | * | 10/2006 | Rankin et al. ............... 711/146 |
| 2002/0115480 | A1 | | 8/2002 | Huang |
| 2003/0135681 | A1 | * | 7/2003 | Laity et al. .................. 710/303 |
| 2004/0057199 | A1 | * | 3/2004 | Azuchi ....................... 361/683 |
| 2004/0150944 | A1 | * | 8/2004 | Byrne et al. ................. 361/683 |
| 2006/0181840 | A1 | * | 8/2006 | Cvetko ....................... 361/679 |

\* cited by examiner

*Primary Examiner*—Jayprakash N Gandhi
*Assistant Examiner*—Anthony Q Edwards
(74) *Attorney, Agent, or Firm*—Fay Kaplun & Marcin, LLP

(57) ABSTRACT

A docking station for a portable electronic device comprises a housing forming a first cradle receiving slot, the housing including a first housing connector within the first cradle receiving slot in combination with a first cradle shell inerrable into the first cradle receiving slot, the first cradle shell being sized and shaped to receive a first portable electronic device therein, the first cradle shell including a first shell inner connector positioned on a device receiving side of the cradle shell so that, when a first portable electronic device is received in the first cradle shell, the first shell inner connector is aligned with a connector of the first portable electronic device and a first shell outer shell connector on a housing facing surface of the first cradle shell, the first shell outer connector being positioned so that, when the first cradle shell is inserted into the first cradle receiving slot, the first shell outer connector aligns with the first housing connector.

17 Claims, 6 Drawing Sheets

RECONFIGURABLE MOBILE DEVICE DOCKING CRADLE

BACKGROUND

Over time, mobile computing devices have become more and more heavily relied on by businesses and the capabilities of these devices are constantly being improved. Upgrading to new devices may require investment not only in the devices themselves but also in the equipment necessary to support these devices.

SUMMARY OF THE INVENTION

The present invention is directed to a docking station for a portable electronic device comprising a housing forming a first cradle receiving slot, the housing including a first housing connector within the first cradle receiving slot in combination with a first cradle shell inerrable into the first cradle receiving slot, the first cradle shell being sized and shaped to receive a first portable electronic device therein, the first cradle shell including a first shell inner connector positioned on a device receiving side of the cradle shell so that, when a first portable electronic device is received in the first cradle shell, the first shell inner connector is aligned with a connector of the first portable electronic device and a first shell outer shell connector on a housing facing surface of the first cradle shell, the first shell outer connector being positioned so that, when the first cradle shell is inserted into the first cradle receiving slot, the first shell outer connector aligns with the first housing connector.

DETAILED DESCRIPTION

Figure 1:
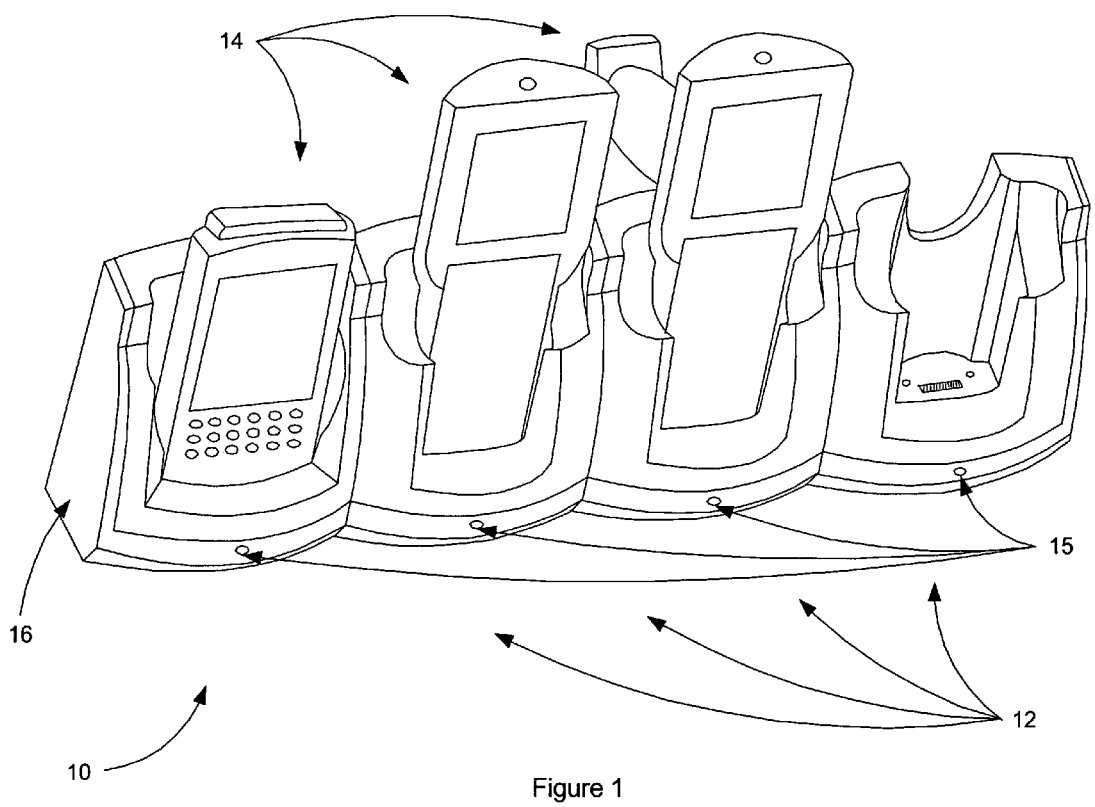
FIG. 1 shows a perspective view of a docking station according to the present invention.

The present invention may be further understood with reference to the following description and the appended drawings, wherein like elements are referred to with the same reference numerals. The present invention will be described in regard to docking stations for personal digital assistants ("PDA's"). However, those skilled in the art will understand that the docking cradle according to the present invention is equally suited for any mobile electronic device relying on a rechargeable battery such as, for example, a barcode scanner, a cellular telephone, blackberry, digital music player, etc.

As shown in FIGS. 1 to 6, a docking station 10 according to the invention includes a housing with a plurality of docking cradles 12, each receiving a mobile device 14 therein for battery charging and/or for wired connection to a computer or network of computers. As can be seen in FIG. 1, the docking station 10 can be configured with docking cradles 12 adapted as described in detail below to receive different mobile devices 14. That is, a first one of the docking cradles 12 may be configured to receive a first mobile device 14 while a rest of the docking cradles 12 are configured to receive one or more mobile devices 14 which may be the same as or different from the first mobile device 14. In addition, the docking station 10 includes a modular docking cradle system that allows the docking cradles 12 to be reconfigured to receive a new type of mobile device 14 while a base 16 of the docking station 10 remains unchanged.

Figure 2:
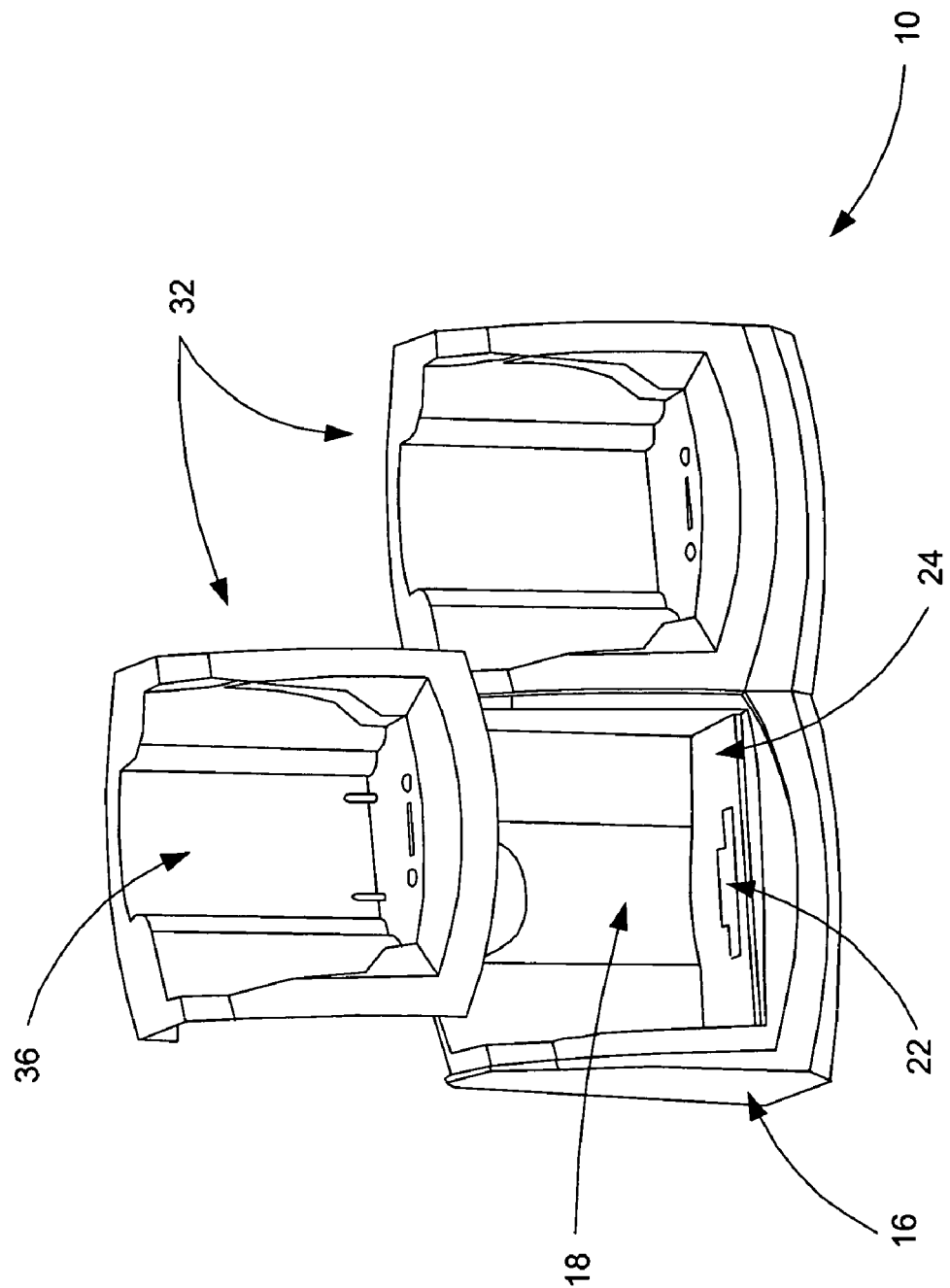
FIG. 2 shows a perspective view of the docking station of FIG. 1 with a first device cradle removed therefrom.
Figure 6:
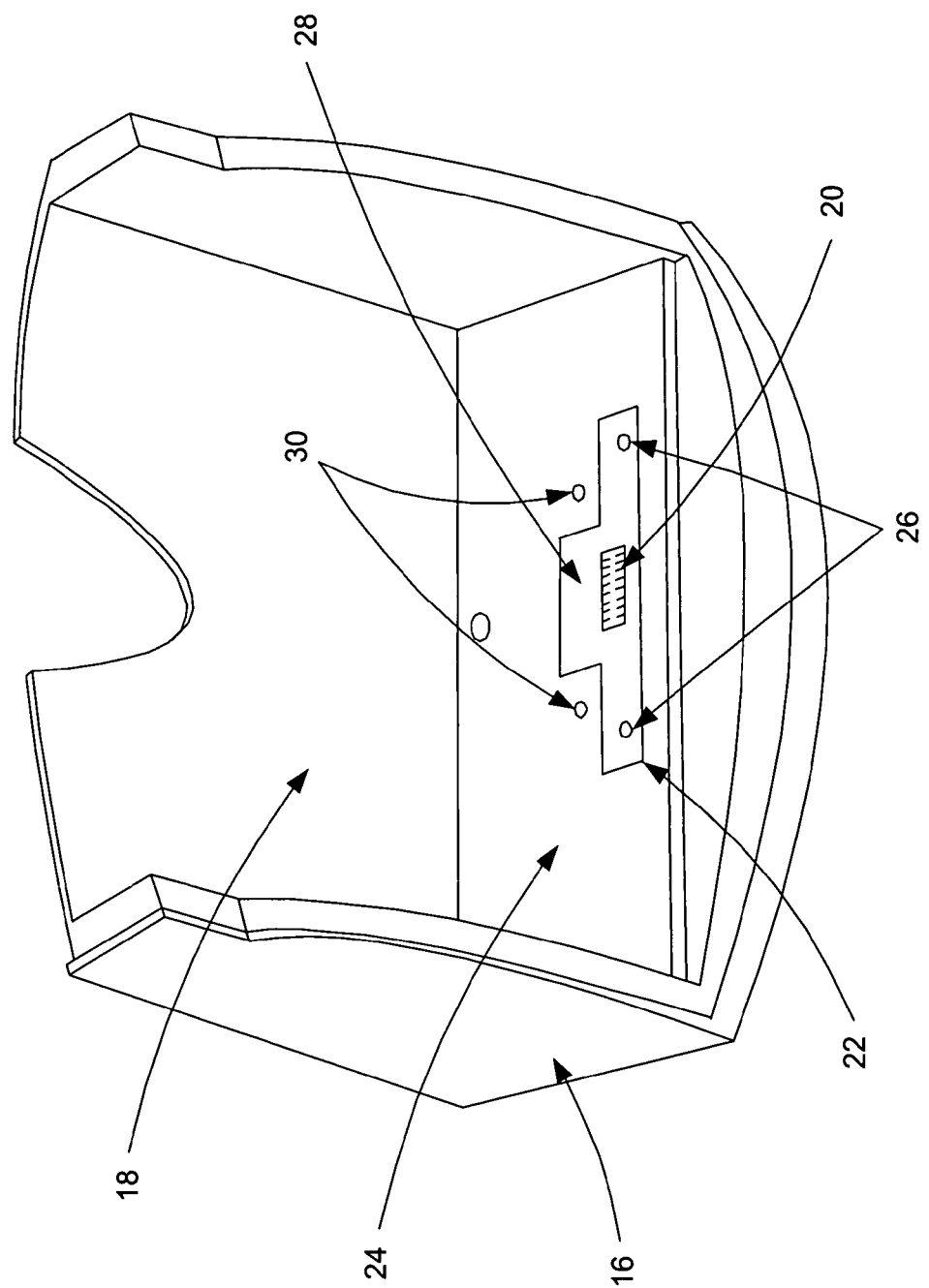
FIG. 6 shows a perspective view of the top of the first device cradle of FIG. 3.

Specifically, as shown in FIGS. 2 and 6, the base 16 of the docking station 10 includes a plurality of cradle receiving slots 18, each of a standard size and shape. Each cradle receiving slot 18 includes a housing connector 20 (for example, a 20 pin connector) within a connector opening 22 formed in a lower surface 24 of the cradle receiving slot 18. A pair of alignment pin receiving holes 26 are formed in a circuit board 28 on which the connector 20 is mounted and a pair of screw receiving holes 30 are formed on either side of the connector opening 22.

Figure 3:
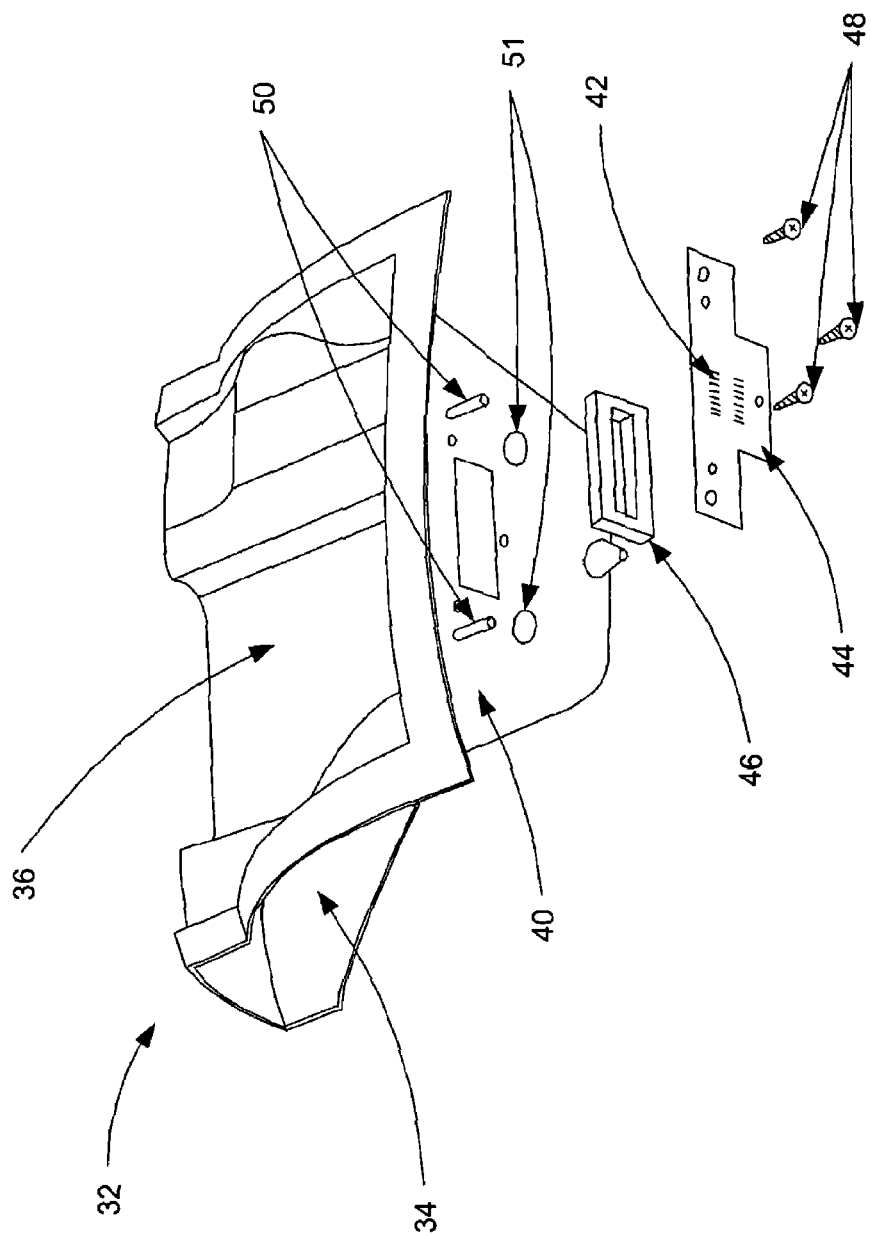
FIG. 3 shows a perspective view of the first device cradle removed from the docking station of FIG. 2.

The cradle receiving slots 18 are configured to receive cradle shells 32 each of which has an inner side 34 configured to match the shape of the cradle receiving slots 18 while an outer side 36 of each cradle shell 32 is configured to receive a corresponding mobile device 14 and hold the mobile device 14 in a desired orientation therein. As shown in FIG. 3, the cradle shells 32 each have a connector (e.g., a shell inner connector, not shown in the figures) mounted on a bottom portion 40 (e.g., a device-receiving side) of the outer side 36. Each connector is positioned and aligned on the bottom portion 40 so that, when a mobile device 14 is received within the cradle shell 32, a connector on a bottom surface of the mobile device 14 is aligned with the connector on the bottom portion 40. The connector on the bottom portion 40 is tailored to receive, or be received by, the connector of the corresponding mobile device 14 and need not match the connector 20. Rather, contacts of the connector on the bottom portion 40 are electrically connected to a shell connector 42 (e.g., a shell outer connector on a housing-facing surface) which, when the cradle shell 32 is received within the cradle receiving slot 18, is coupled to the connector 20 in a predetermined alignment. That is, where the connector 20 is a 20 pin connector, the shell connector 42 will have 20 contacts aligned with the pins of the connector 20 when the shell 32 is received within a cradle receiving slot 18. As would be understood by those skilled in the art, this allows the cradle shells 32 to be configured to receive mobile devices 14 having connectors with any number of contacts, equal to or less than the number of contacts in the connector 20. In addition, as would be recognized by those skilled in the art, the connector on the bottom portion 40 may be disposed in any orientation with respect to the shell connector 42 and the connector 20. For example, a cradle shell 32 may be made with the connector on the bottom portion 40 substantially perpendicular to the connector 20, allowing a mobile device to be received therein substantially perpendicular to a length of the docking station 10. Further, the docking station 10 may include a mounting mechanism (e.g., hook, adhesive pad, screw-receiving cut-outs, etc.) for mounting on a surface (e.g., a wall, a panel of a vehicle, etc.).

Figure 4:
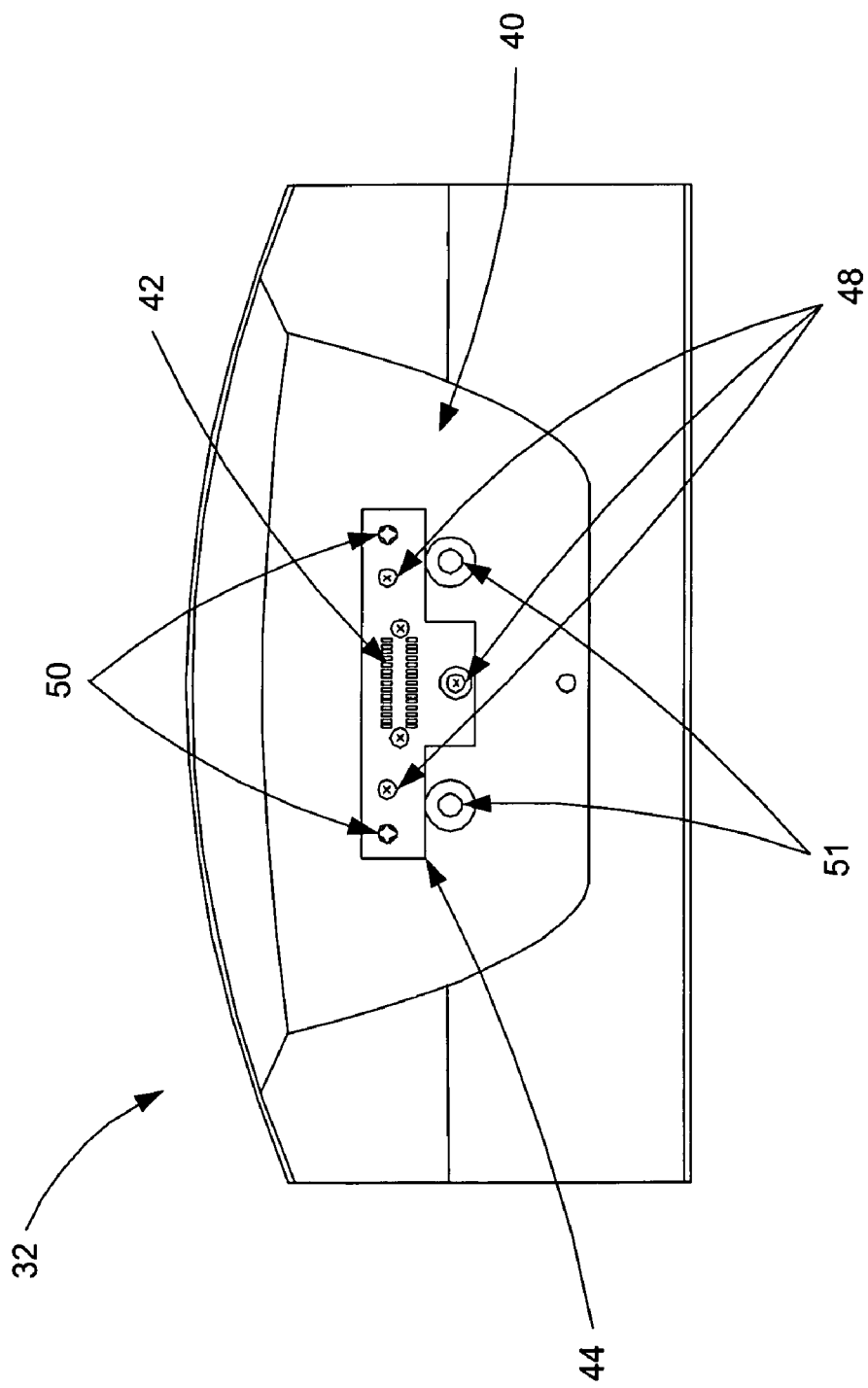
FIG. 4 shows a bottom view of the first device cradle of FIG. 3.

According to an exemplary embodiment of the invention, as shown in FIGS. 3 and 4, the shell connector 42 includes a plurality of contacts formed on an exposed surface of a circuit board 44 mounted on the outer side 36 of the cradle shell 32. A gasket 46 may be mounted between the circuit board 44 and the outer side of the cradle shell 36 with the circuit board 44 mounted to the cradle shell 32 by, for example, screws 48 or other fasteners. Two aligning pins 50 extend from the bottom surface of the outer side 36 of the cradle shell 32, passing through two aligning holes formed in the circuit board 44.

When the cradle shell 32 is mounted in a cradle receiving slot 18, the aligning pins 50 enter the alignment pin receiving holes 26 of the cradle slot 18 to ensure that the contacts of the connector 42 are precisely aligned with the contacts of the connector 20. The cradle shell 32 may then be secured in the proper position by insertion of screws (or other fasteners) through securing holes 51 formed in the bottom surfaces of the cradle shells 32 into the screw receiving holes 30 formed in the bottom surface of the cradle receiving slots 18.

Figure 5:
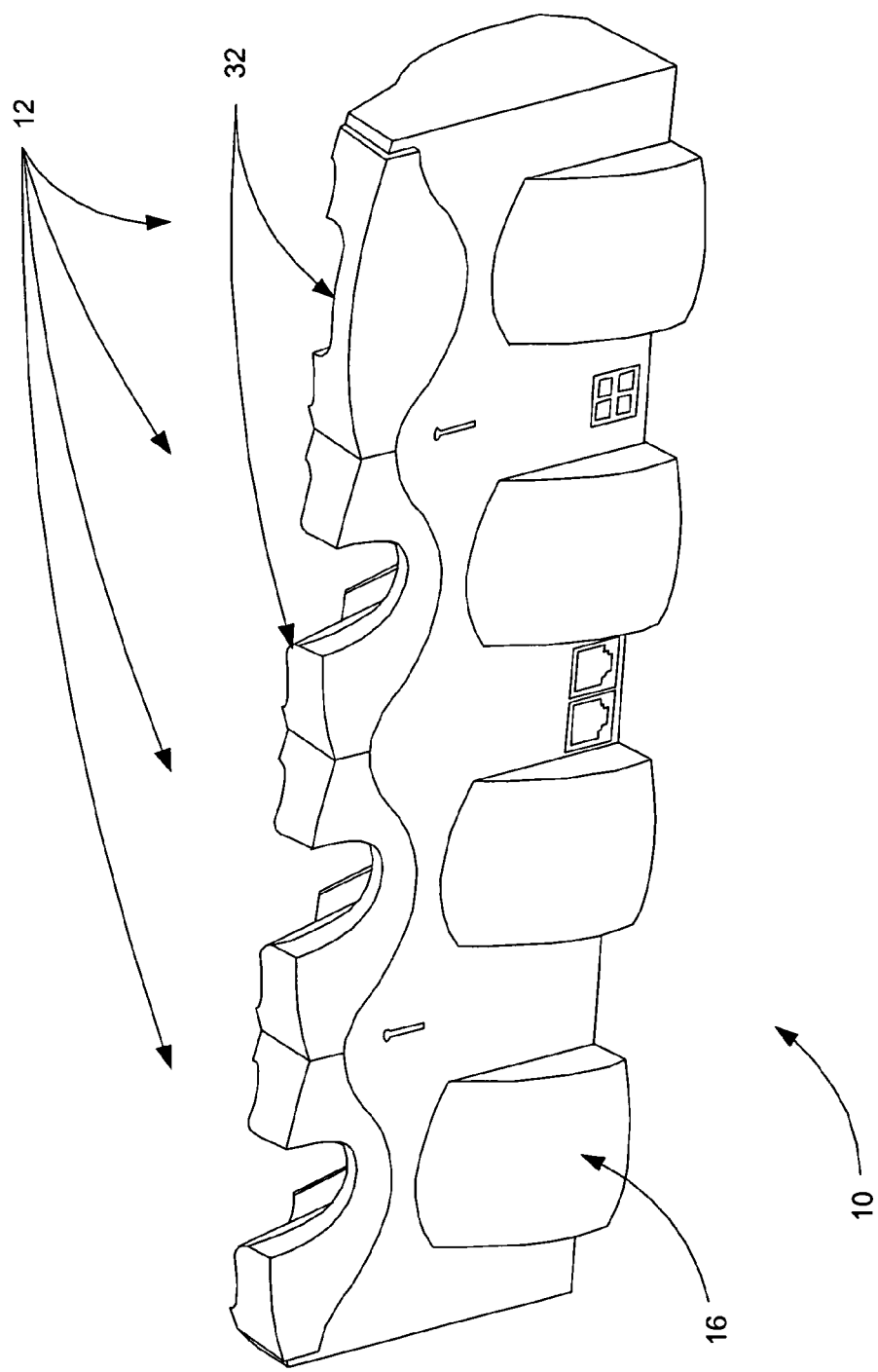
FIG. 5 shows a back view of the docking station of FIG. 1.

In another exemplary embodiment, as shown in FIG. 5, the docking station 10 further includes one or more ports (e.g., Ethernet, USB, serial, parallel, etc.) for receiving a cable for communication between the mobile device 14 and a computing device (e.g., a server, a PC, a laptop, etc.). Thus, the first mobile device 14, when coupled to the docking station 10, may communicate with the computing device and the other mobile devices 14 coupled to the docking station 10. For example, after collecting data (e.g., barcode data), the mobile device 14 may be coupled to the docking station 10 for transmitting the data to the computing device. Also, the mobile device 14 may received further data (e.g., updated data, instructions, server messages, etc.) when coupled to the docking station 10.

According to the present invention, the cradle shell 32 may be configured to receive the mobile device 14 even with one or more attachments thereon. For example, in one embodiment, the barcode scanner may have a trigger-handle attachment coupled thereto. In this manner, it would be inconvenient if a user had to decouple the trigger-handle attachment from the scanner. Thus, the cradle shell 32 may further include a cut-away portion which allows the mobile device 14 to engage the connector 20 and remain coupled to the attachment. As shown in FIG. 1, the trigger-handle attachment would fit within the cut-away portion.

In another exemplary embodiment of the present invention, the docking station 10 may include one or more light-emitting diodes (LEDs) disposed thereon. For example, the docking station 10 may include a single LED which has a first state (e.g. On) indicating the docking station 10 is receiving power and/or is connected to the computing device. In a second state (e.g., Off, blinking, etc.), the single LED indicates that the docking station 10 is not powered and/or is disconnected from the computing device.

The docking station 10 may include a predetermined number of LEDs where the predetermined equals a number of docking cradles 12. For example, in the embodiment of the docking station 10 shown in FIG. 1, four LEDs 15 would be disposed thereon, each LED 15 adjacent to a corresponding docking cradle 12 and/or cradle receiving slot 18. In this manner, each LED 15 may have a series of states which indicate a condition of the docking station 10, the docking cradle 12 and/or the mobile device 14 in the docking cradle 12. For example, when an LED 15 is in a first state (e.g., Off), the mobile device 14 may not be correctly received the docking cradle 12 and/or the docking station 10 may not be powered. In a second state (e.g., solid red), the mobile device 14 may be received by the docking cradle 12, but communication with the docking station 10 is unable to be initiated. In the second state, however, the mobile device 14 may be able to charge a battery thereof. In a third state (e.g., flashing green), the mobile device 14 is received by the docking cradle 12 and is actively communicating with the computing device and/or other mobile devices 14. Also, in the third state, the mobile device 14 may be charging the battery thereof. In a fourth state (e.g., solid green), the mobile device 14 is received by the docking cradle 12 and has completed a communication session with the computing device. The battery of the mobile device 14 may be charged in the fourth state. As understood by those of skill in the art, each of the LEDs 15 may include a fifth state which indicates that the battery of the mobile device 14 is fully charged. However, the mobile device 14 may include such an indication (e.g., display on LCD, alarm, etc.).

In the above-described embodiment, each LED 15 adjacent to a corresponding docking cradle 12 may operated independently of the other LEDs 15. For example, as described above, each LED 15 may indicate the connection, power delivery and/or data transfer between the corresponding mobile device and the computing device. However, if all of the LEDs 15 enter a predetermined state (e.g., blinking red) at a single time, the docking station 10 may have malfunction and/or be disconnected from the computing device. This predetermined state may be indicated upon, for example, powering the docking station 10.

Those skilled in the art will understand that this arrangement vastly increases the flexibility of the docking station 10 both with respect to the simultaneous accommodation of various types of mobile devices 14 and with respect to altering the docking station 10 over time as mobile devices 14 are replaced with new devices. That is, when mobile devices 14 are replaced with, for example, an updated model, it is not necessary to replace the entire charging apparatus as is commonly the case. Rather, only the cradle shells 32 need to be replaced while the rest of the docking station 14 continues in use. Similarly, due to the modularity of the cradle shells 32 and the components thereof, if one cradle shell 32 fails (e.g., cracks, connector malfunction, etc.), only that cradle shell 32 need be replaced while the others remain intact and functional.

Furthermore, those skilled in the art will understand that the particular connector 20 may be any connector with any number of contacts which will preferably be selected to accommodate a wide range of mobile devices 14 without unduly increasing the cost of the docking station 10. Those skilled in the art will understand that, for an application where flexibility is more important, for example, to accommodate mobile devices 14 with connectors having a greater number of contacts, the number of contacts on the connector 20 may be increased indefinitely.

It will be apparent to those skilled in the art that various modifications and variations can be made in the structure and the methodology of the present invention, without departing from the spirit or scope of the invention. For example, those skilled in the art will understand that the connector 20 in the cradle receiving slot 18 and the shell connector 42 may be mounted at any location on the surface of the cradle receiving slot 18 and the outer side 36 of the cradle shell 32 so long as they are aligned with one another. Thus, it is intended that the present invention cover the modifications and variations of this invention provided they come within the scope of the appended claims and their equivalents.

What is claimed is:

1. A docking station for a portable electronic device comprising:
   a housing forming a first cradle receiving slot, the housing including a first housing connector within the first cradle receiving slot and an alignment hole;
   a first cradle shell insertable into the first cradle receiving slot, the first cradle shell being sized and shaped to receive a first portable electronic device therein, the first cradle shell including a first shell inner connector positioned on a device receiving side of the cradle shell so that, when a first portable electronic device is received in the first cradle shell, the first shell inner connector is aligned with a connector of the first portable electronic device and a first shell outer shell connector on a housing facing surface of the first cradle shell including an alignment feature, the first shell outer connector being positioned so that, when the first cradle shell is inserted into the first cradle receiving slot, the alignment feature that extends through and mates with the alignment hole so that the first shell outer connector aligns with the first housing connector.

2. The docking station according to claim 1, wherein the first housing connector includes a number of contacts at least as large as a number of contacts on a connector of a portable device to be received within the docking station.

3. The docking station according to claim 1, wherein the housing further comprises a second cradle receiving slot with a second housing connector positioned therein, a second cradle shell being insertable into the second cradle receiving slot, the second cradle shell being sized and shaped to receive a second portable electronic device therein, the second cradle shell including a second shell inner connector positioned on a device receiving side of the cradle shell so that, when a second portable electronic device is received in the second cradle shell, the second shell inner connector is aligned with a connector of the second portable electronic device and a second shell outer shell connector on a housing facing surface of the second cradle shell, the second shell outer connector being positioned so that, when the second cradle shell is inserted into the second cradle receiving slot, the second shell outer connector aligns with the second housing connector.

4. The docking station according to claim 3, wherein the first and second cradle receiving slots are substantially equally sized and shaped and wherein, when the second cradle shell is inserted into the first cradle receiving slot, the second shell outer connector aligns with the first housing connector.

5. The docking station according to claim 1, wherein the first and second cradle shells are configured to receive different mobile devices.

6. The docking station according to claim 2, wherein the number of contacts of the first housing connector is less than a number of contacts on the first shell inner connector.

7. The docking station according to claim 1, wherein the first cradle shell includes a device aligning feature ensuring that a first portable device inserted therein is maintained in a desired position and orientation with the first shell inner connector aligning with a connector of the first portable device.

8. The docking station according to claim 1, further comprising a gasket mounted between the first shell outer connector and an outer surface of the first shell.

9. The docking station according to claim 1, wherein the first cradle receiving slot includes a first surface including a connector recess formed therein, the housing connector being mounted on a circuit board received within the recess.

10. The docking station according to claim 9, wherein the circuit board on which the aligning feature of the first cradle receiving slot comprises an aligning hole extending through the circuit board on which the connector is mounted.

11. The docking station according to claim 1, wherein the first cradle shell includes at least one mounting hole for receiving a fastener to bind the first cradle shell in a predetermined position therein.

12. A docking station for a portable electronic device comprising: a base including a multi-contact electrical connector and an alignment hole;
a removable cradle mountable on the base, the cradle including an alignment feature that extends through and mates with the alignment hole and a first connector which, when the cradle is mounted on the base electrically couples to the multi-contact electrical connector or the base and a second connector electrically coupled to the first connector, the second connector mating with a portable device received within the cradle.

13. The docking station according to claim 12, wherein the base includes a plurality of multi-contact electrical connectors, over each of which a separate removable cradle may be mounted.

14. A docking station for a portable electronic device comprising:
a housing forming a plurality of cradle receiving slots, the housing including a plurality of housing connectors, each housing connector being within a corresponding cradle receiving slot and a plurality of alignment holes;
a plurality of cradle shells, each cradle shell insertable into the corresponding cradle receiving slot, each cradle shell being sized and shaped to receive a corresponding portable electronic device therein, each cradle shell including a shell inner connector positioned on a device receiving side of the cradle shell so that, when the corresponding portable electronic device is received in the cradle shell, the shell inner connector is aligned with a connector of the corresponding portable electronic device and a shell outer connector on a housing facing surface of the cradle shell including and alignment feature, the shell outer connector being positioned so that, when the cradle shell is inserted into the corresponding cradle receiving slot, the alignment feature that extends through and mates with the alignment hole so that the shell outer connector aligns with the corresponding housing connector.

15. The docking station according to claim 14, wherein each housing connector includes a number of contacts at least as large as a number of contacts on a connector of the corresponding portable device to be received within the docking station.

16. The docking station according to claim 14, wherein at least two of the plurality of cradle shells are configured to receive different portable electronic devices.

17. The docking station according to claim 14, wherein each cradle shell includes an aligning feature mating with a corresponding aligning feature of the corresponding cradle receiving slot to ensure that, when the cradle shell is inserted into the corresponding cradle receiving slot, the shell outer connector is aligned with the corresponding housing connector.

* * * * *